Nov. 4, 1958 R. A. BOYD 2,858,734
SKYLIGHTS
Filed Feb. 8, 1956 6 Sheets-Sheet 1

Fig. 1

INVENTOR.
ROBERT A. BOYD
BY
ATTORNEYS.

Nov. 4, 1958

R. A. BOYD 2,858,734

SKYLIGHTS

Filed Feb. 8, 1956

INVENTOR.
ROBERT A. BOYD
BY
ATTORNEYS.

Nov. 4, 1958

R. A. BOYD

2,858,734

SKYLIGHTS

Filed Feb. 8, 1956

INVENTOR.
ROBERT A. BOYD
BY
ATTORNEYS.

Nov. 4, 1958   R. A. BOYD   2,858,734
SKYLIGHTS
Filed Feb. 8, 1956   6 Sheets-Sheet 4

INVENTOR.
ROBERT A. BOYD
ATTORNEYS.

United States Patent Office 2,858,734
Patented Nov. 4, 1958

2,858,734

SKYLIGHTS

Robert A. Boyd, Ann Arbor, Mich., assignor to Owens-Illinois Glass Company, a corporation of Ohio Application February 8, 1956, Serial No. 564,288

35 Claims. (Cl. 88—59)

This invention relates to the utilization of daylight for lighting the interior of buildings through an opening in a roof or ceiling.

In the utilization of daylight for lighting a building through an opening in a roof or ceiling, major problems are encountered because the direct sunlight from higher altitudes provides an excessive amount of light and heat. This condition is especially present during the summer months when the sun is at the higher altitudes.

It has heretofore been proposed that skylights might be constructed which comprise rectangular glass blocks having flat parallel faces. Such blocks may be mounted in panels comprising a multiplicity of blocks which are positioned in the opening in the roof or ceiling. The construction of such blocks may be according to the disclosure set forth in my copending applications, titled Skylights, Serial No. 295,730, filed June 26, 1952, now Patent No. 2,812,690, issued November 12, 1957, and Serial No. 358,277, filed May 29, 1953, now Patent No. 2,812,691, issued November 12 1957.

Although such skylight panels have resulted in a utilization of daylight to a degree which has not heretofore been obtained, such panels have certain undesirable features. Due to the metal that must be used in assembling the multiplicity of glass blocks into panels, the resultant panels are quite heavy. In addition, the metals or other materials which are used in making the panels serve as a means of conducting heat through the panel which is undesirable. Such metal parts or other materials which are used between the glass blocks interfere with the control of the light through the glass blocks.

A further disadvantage of these glass block panels is that they must be carefully constructed to prevent water or the like from collecting on the surface of the panel.

It is therefore an object of this invention to provide an improved skylight which rejects direct sunlight from high altitudes and transmits sunlight from low altitudes and light from the northern sky.

It is a further object of this invention to provide such a skylight which is relatively light.

It is a further object of this invention to provide such a skylight in which heat transmission is reduced.

It is a further object of this invention to provide such a skylight wherein there is a minimum interference with light control.

It is a further object of this invention to provide such a skylight which may be mounted in horizontal position in the opening in the roof or ceiling and yet will provide the necessary drainage.

The problem of illumination through an opening in a ceiling or roof may be readily understood by considering the position of the sun. Sunlight passing through an opening in the ceiling emanates from a southerly direction in the Northern Hemisphere. At high altitude angles of the sun the amount of light and heat emanating therefrom is excessive and undesirable. The light from the sun at low altitude angles and the light from the northern sky is preferred for illuminating the interior of a room. This is shown more clearly by the following table of meteorological data representing conditions at 42° north latitude.

Table I

| Day of Year | Maximum Sun Altitude, degrees | Normal Sun Intensity (ft.-c.) | Horizontal Surface Sun Only (ft.-c.) | Illumination Clear Sky |
|---|---|---|---|---|
| June 21 | 71½ | 9,180 | 8,700 | 1,600 |
| May 21 and July 21 | 68½ | 9,070 | 8,400 | 1,500 |
| Apr. 21 and Aug 21 | 60 | 8,900 | 7,700 | 1,400 |
| Mar. 21 and Sept. 21 | 48½ | 8,800 | 6,600 | 1,200 |
| Feb. 21 and Oct. 21 | 27½ | 8,250 | 5,000 | 1,000 |
| Jan. 21 and Nov. 21 | 28 | 7,500 | 3,500 | 800 |
| Dec. 21 | 24½ | 7,000 | 2,900 | 800 |

As shown in Table I, the sun altitude and sun intensity vary throughout the year, the maximum occurring during the months from April through August. Table I further shows that the greater portion of the horizontal surface illumination is due to light from the sun and a much lesser portion is due to the clear (northern) sky.

I have found that the desired control of illumination through an opening may be obtained by positioning a generally circular block comprising spaced sheets of light-transmitting material in parallel position in the opening, the block having the top sheet thereof adjacent the exterior curved and formed with prisms in a novel manner to provide the control of illumination. The planes of the sheets are preferably positioned horizontally but may form angles of as great as 20° with the horizontal.

Figure 1:
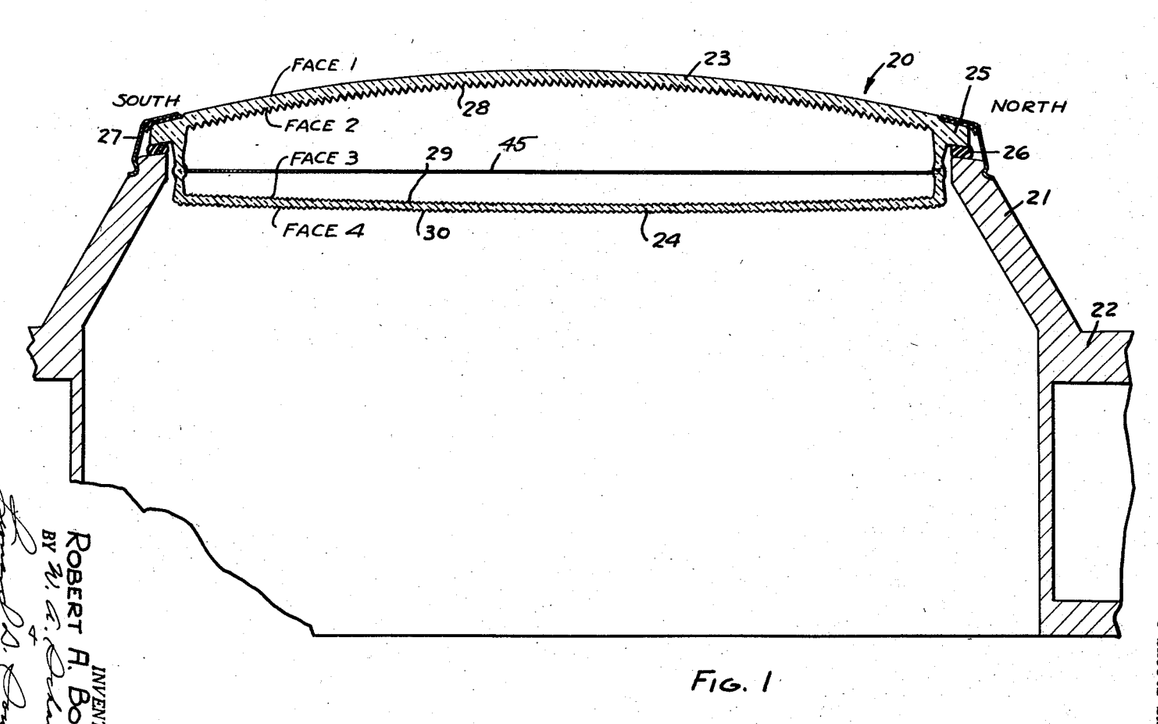
Fig. 1 is a sectional elevational view through a skylight embodying the invention and mounted in an opening in a roof or ceiling.
Figure 2:
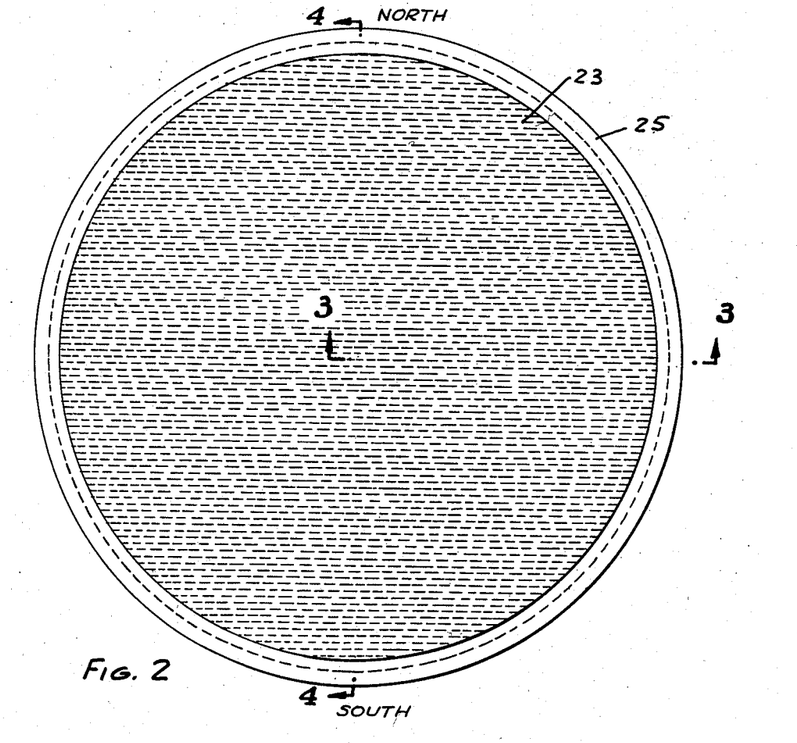
Fig. 2 is a plan view of the skylight embodying the invention.

Referring to Figs. 1 and 2, the skylight comprises a circular block 20 made of light-transmitting material such as glass or plastic which is mounted on a curb 21 surrounding the opening in ceiling 22. The block 20 is circular in plan view and comprises spaced walls 23, 24 and a peripheral rim 25 which rests on a gasket 26 supported by the top of the curb 21. The block 20 is held in position on the curb 21 by any suitable means such as a peripheral bracket 27.

The wall 23 of the block 20 which is adjacent the exterior of the room is preferably spherical while the wall 24 adjacent the interior of the room is slightly spherical or flat. By the above construction the glass block 20 provides four interfaces which may be referred to as Face 1 and Face 2 on wall 23 and Face 3 and Face 4 on wall 24. Face 1 is the interface nearest the light, Faces 2 and 3 are the intermediate interfaces and Face 4 is the interface nearest the interior of the room.

Figure 3:
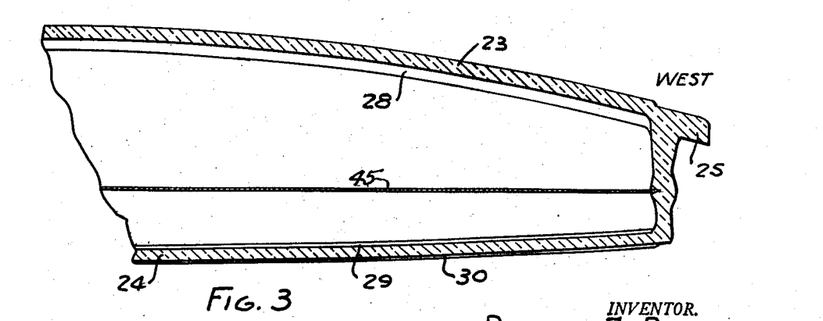
Fig. 3 is a fragmentary sectional elevational view taken along the line 3—3 in Fig. 2 on a slightly enlarged scale.

Face 1 is preferably smooth and convex while Face 2 is concave and is provided with a series of parallel prism-shaped ribs 28, hereinafter referred to as prisms, having particular configurations as presently described. As shown in Figs. 1, 2 and 3, the prisms 28 extend longitudinally in a generally east-west direction when the skylight is placed in an opening in a ceiling or roof. Faces 3 and 4 may be provided with ribs or prisms 29, 30 as hereinafter described of such a construction that daylight transmitted thereto is diffused into the interior of the room. In addition, a glass fiber mat 45 may be interposed between the walls 23, 24 to provide further diffusion if it is desired.

According to the invention, the prisms 28 on Face 2 are so constructed and arranged that sunlight from high altitude angles is substantially rejected and sunlight from low altitude angles and light from the northern sky is transmitted. More specifically, sunlight from high altitude angles is refracted by Face 1 and substantially totally internally reflected at Face 2 and thereby rejected.

Figure 4:
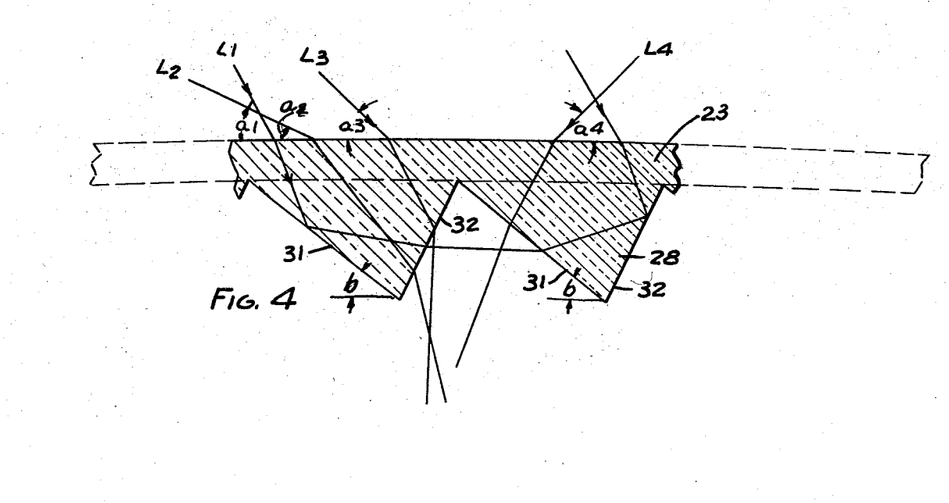
Fig. 4 is a fragmentary elevational view taken along the line 4—4 in Fig. 2 on a greatly enlarged scale.

The manner in which such a control of light is achieved may be shown by referring to Fig. 4 which is a section through the prisms at an area corresponding to the uppermost portion of the spherical wall 23. At this area Face 1 is substantially plane. As shown in Fig. 4, the prisms 28 on Face 2 comprise surfaces 31, 32 at an included angle P, with the surface 31 forming an angle $b$ with the horizontal plane of Face 1. When the skylight is placed in position in an opening in the ceiling, the skylight is oriented so that the prisms 28 extend in a generally east-west direction with the surfaces 32 extending toward the north and facing the south.

A light ray $L_1$ at a high sun altitude angle $a_1$ is refracted at Face 1, transmitted to and reflected from the southern slope or surface 31 to the surface 32, refracted through surface 32 to surface 31 of the adjacent prism refracted through surface 31 to surface 32 and reflected therefrom to Face 1 and refracted out to the atmosphere. In a similar manner, light rays at altitude angle $a_1$ striking the northern slope or surface 32 are totally rejected as represented by the double arrows in Fig. 4. On the other hand, a light ray $L_2$ from a low sun altitude angle $a_2$ is refracted at Face 1 and refracted out of surface 32 toward the interior. A light ray $L_3$, representing light at an intermediate sun altitude angle $a_3$ is refracted at Face 1, transmitted to and refracted through surface 32 toward the interior. A light ray $L_4$ representing light from the northern sky at an angle $a_4$ is refracted at Face 1, transmitted to and through the surface 31 toward the interior.

Referring to Figs. 1 and 3, for any predetermined sun altitude, the angle which a sun ray makes with the surface of Face 1 varies dependent upon the point at which the light ray strikes the convex surface of Face 1. At the uppermost central portion of Face 1, such as shown in Fig. 4, the altitude angle of the sun ray and the angle which the ray makes with the surface of Face 1 are identical. However, if the sun ray at the same altitude angle strikes a portion of Face 1 nearer the south, the angle between the light ray and the surface of Face 1 is greater than the sun altitude. If the sun rays strike a portion of Face 1 nearer the north, the angle between the light ray and the surface of Face 1 is less than the altitude angle.

I have found that the angle $b$ which the southern slope or surface 31 makes with the horizontal should be progressively smaller for the prisms extending from the uppermost and central portion of wall 23 toward the southerly direction and the angle $b$ should be progressively larger for the prisms extending from the uppermost and central part toward the north. This, in effect, rotates the prisms about their east-west axes.

Thus, the width of the southern slopes or surfaces becomes shortened in the prisms from the uppermost portion of wall 23 toward the southerly direction and becomes progressively lengthened from the uppermost portion toward the northerly direction. On the other hand, the northern slopes or surfaces 32 become progressively lengthened from the uppermost portion toward the southerly direction and progressively shortened from the uppermost portion toward the northerly direction.

Figure 5:
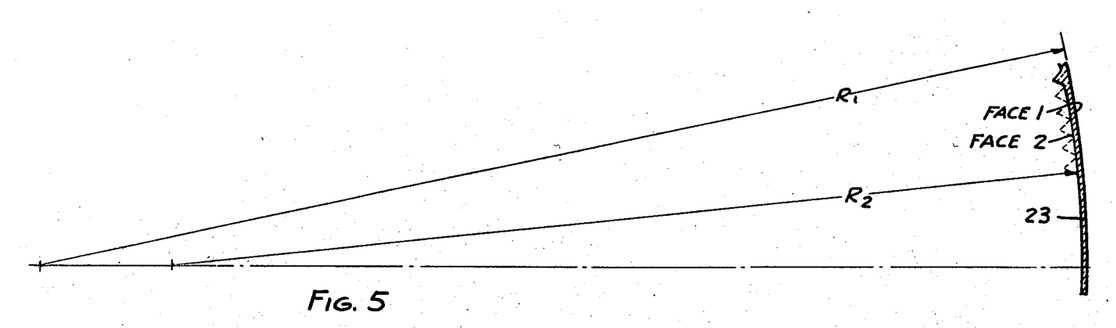
Fig. 5 is a fragmentary view showing a portion of the skylight on a greatly reduced scale.

As shown diagrammatically in Fig. 5, where the block is made of glass, for example, by pressing a plunger into a glass charge, the radius of curvature $R_1$ of Face 1 is greater than the radius of curvature $R_2$ of Face 2 in order to provide clearance for the plunger; and as a result, the thickness of the wall 23 becomes progressively greater from the center toward the edges thereof.

Figure 6:
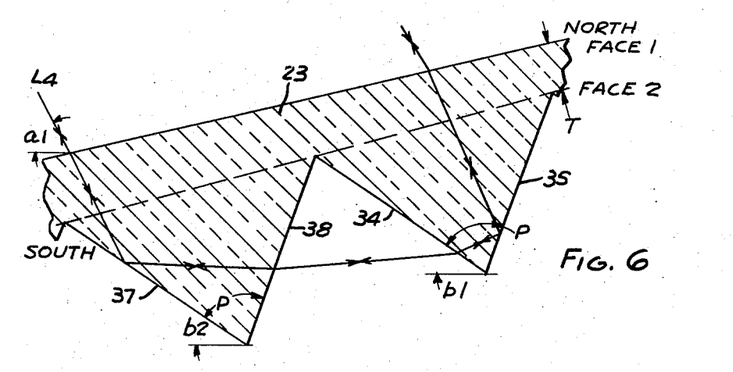
Figs. 6, 7 and 8 are fragmentary sectional views through various portions of the skylight showing the path of sunlight from high altitude angles.
Figures 7, 8:
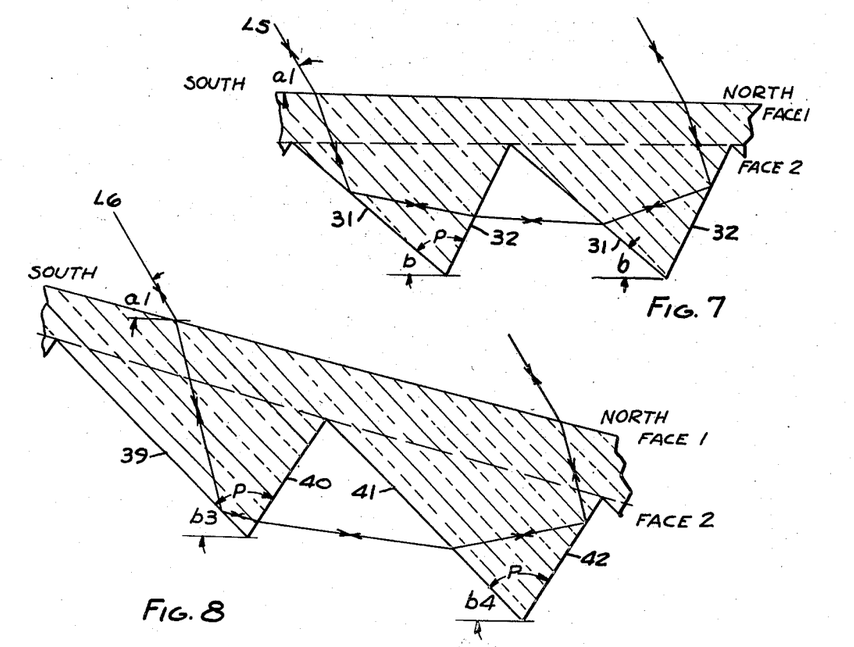
Figure 9:
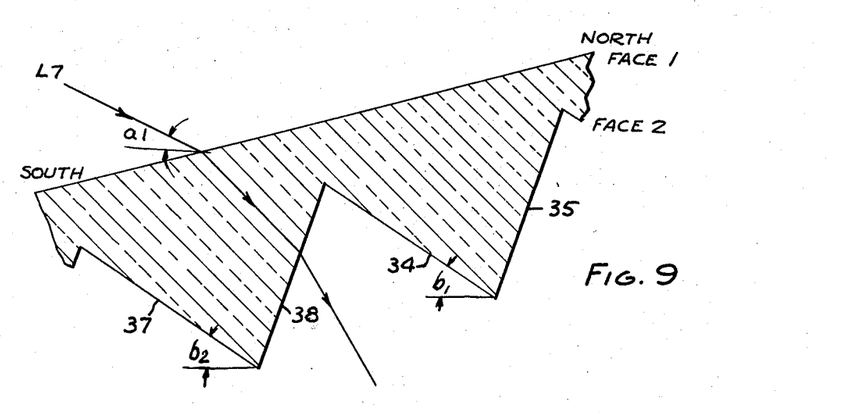
Figs. 9, 10 and 11 are fragmentary sectional views through various portions of the skylight showing the path of sunlight from low altitude angles.
Figure 10:
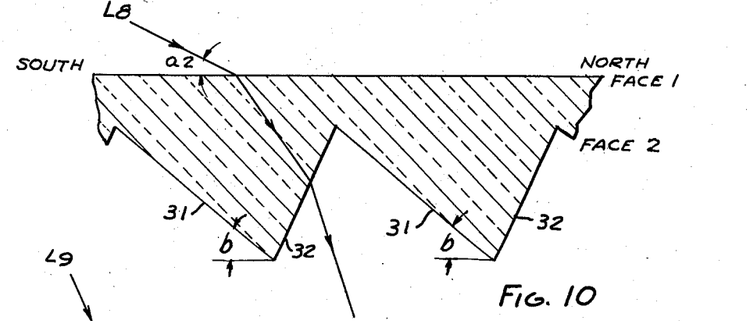
Figure 11:
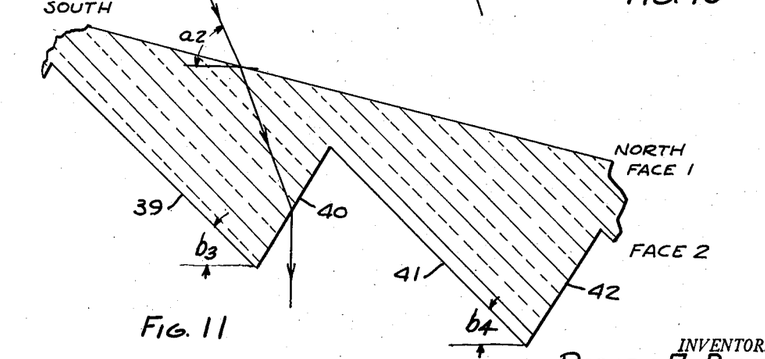
Figure 12:
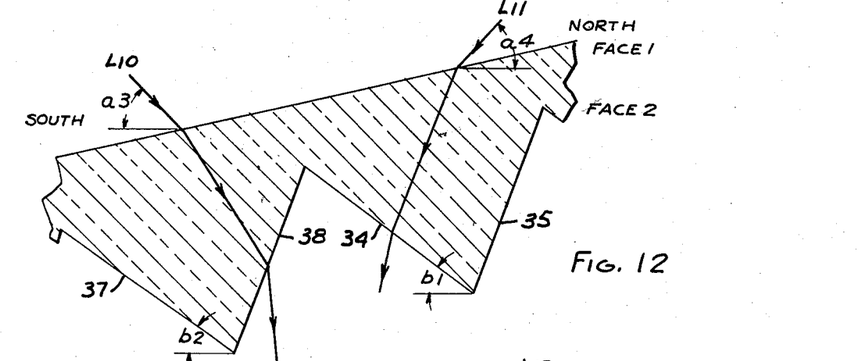
Figs. 12, 13 and 14 are fragmentary sectional views through various portions of the skylight showing the path of light from the northern sky.
Figure 13:
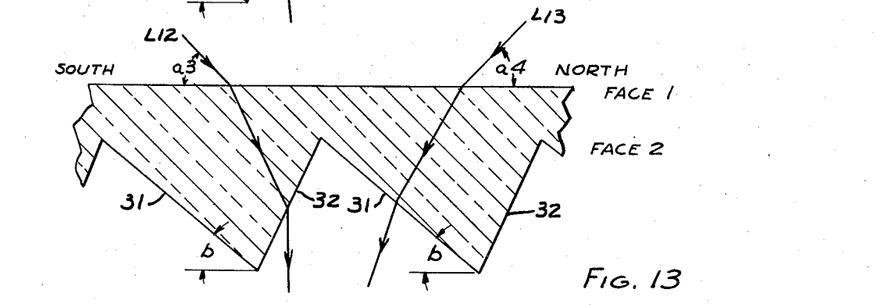
Figure 14:
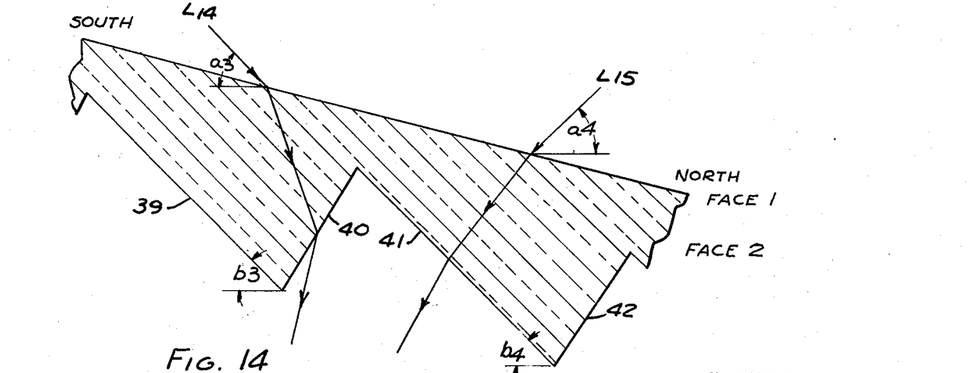

The manner in which the angle $b$ is changed to, in effect, rotate the prisms about their east-west axes may be shown by reference to Figs. 6 through 14. Figs. 7, 10 and 13 are sectional views of the prisms taken at the uppermost and central portion of the wall 23. Figs. 6, 9 and 12 are sectional views of the prisms taken between the uppermost portion of the wall 23 and the southerly part of the wall. Figs. 8, 11 and 14 are sectional views of the prisms taken between the uppermost portion of the wall 23 and the northerly part of the wall 23. In all these portions, the included angle between the surfaces of the prisms remains equal to P.

As shown in Fig. 7, the surface 31 makes an angle $b$ with the horizontal. However, as the prisms nearer the southerly part of the wall 23, as shown in Fig. 6, the angle $b_1$ which the southern slope or surface 34 makes with a horizontal is smaller than the angle $b$. The southerly surface 37 of the adjacent prism nearer the south forms an angle $b_2$ with a horizontal which is less than $b_1$. In addition, the thickness T of the wall 23 increases progressively from the uppermost portion toward the edges of the wall 23. As a result, the southerly surface 34 is less wide than the southerly surface 31 of the prism nearer the central portion of the wall while the southerly surface 37 is less wide than the surface 34. At the same time, the northerly surface 38 is wider than the surface 35 which is, in turn, wider than the surface 32.

Similarly, in the prisms extending between the central portion of the wall 23 and the northernmost portion of the wall, as shown in Fig. 8, the included angle is P. The angle $b_3$ which the southern slope 39 makes with the horizontal is greater than the slope 31 (Fig. 7) while the angle $b_4$ which the slope 41 of the adjacent prism nearer the north makes with the horizontal is greater than the angle $b_3$. The thickness T increases between the central portion and the edge of the wall. The width of the southern slope 39 is greater than the width of the slope 31 of the prisms at the center of the wall 23 while the width of the southern slope 41 of the prism nearer the northern edge of the wall is greater than the width of the surface 39. At the same time, the northern slopes become progressively less wide between the central portion of the wall and the northern edge of the wall, as shown by surfaces 40 and 42.

The action of the prisms in rejecting sunlight from high altitude angles is shown by reference to Figs. 6, 7 and 8. As shown in Fig. 6, a light ray $L_4$ at a high sun altitude angle $a_1$ is refracted by Face 1, transmitted to surface 37 and reflected from surface 37 to surface 38, refracted through surface 38 to surface 34, refracted through surface 34 to surface 35 and reflected from surface 35 to Face 1 and refracted out to the atmosphere.

A light ray $L_5$ striking the central portion of the wall 23, as shown in Fig. 7, at the same altitude angle $a_1$, is refracted at Face 1, transmitted to and reflected from the surface 31 to surface 32, refracted through surface 32 to surface 31 of the adjacent prism, refracted through surface 31 to surface 32 and reflected therefrom to Face 1 and refracted out to the atmosphere.

A light ray $L_6$ at the same altitude angle $a_1$ striking the portion of the wall 23 between the central portion and the northernmost portion is refracted at Face 1, transmitted to and reflected from surface 39 to surface 40, refracted through surface 40 to surface 41 of the adjacent prism and refracted through surface 41 to surface 42 and reflected therefrom to Face 1 and refracted out to the atmosphere. In a similar manner, light rays first striking the northern slopes or surfaces are totally rejected as represented by the double arrows in Figs. 6, 7 and 8.

The action of the prisms in transmitting sunlight from low sun altitude angles is shown by reference to Figs. 9, 10 and 11.

As shown in Fig. 9, light ray $L_7$ from a low altitude angle $a_2$ is refracted at Face 1, transmitted to surface 38 and refracted therefrom to the interior of the room. As shown in Fig. 10, a light ray $L_8$ at the same altitude angle $a_2$ is refracted at Face 1 and transmitted to surface 32 and thereafter refracted from surface 32 to the interior of the room. As shown in Fig. 11, a light ray $L_9$ at the same altitude angle $a_2$ is refracted at Face 1, transmitted to surface 40, refracted therefrom to the interior of the room.

The action of the prisms on Face 2 in transmitting light from intermediate sun altitude angles and light from the northern sky is shown by reference to Figs. 12, 13 and 14.

As shown in Fig. 12, a light ray $L_{10}$ from an intermediate altitude angle $a_3$ is refracted at Face 1, transmitted to surface 38 and refracted therefrom to the interior of the room. A light ray $L_{11}$ from the northern sky at an altitude angle $a_4$ is refracted at Face 1, transmitted to surface 34 and refracted therefrom to the interior of the room. As shown in Fig. 13, a light ray $L_{12}$ at an intermediate altitude angle $a_3$ is refracted at Face 1, transmitted to surface 32 and refracted from surface 32 to the interior of the room. A light ray $L_{13}$ from the northern sky at an altitude angle $a_4$ is refracted at Face 1, transmitted to surface 31 and thereafter refracted from surface 31 to the interior of the room. As shown in Fig. 14, a light ray $L_{14}$ from a sun altitude angle $a_3$ is refracted at Face 1, transmitted to surface 40, and refracted from surface 40 to the interior of the room. A light ray $L_{15}$ from the northern sky at an altitude angle $a_4$ is refracted at Face 1, transmitted to surface 41 and refracted from surface 41 to the interior of the room.

As shown by Figs. 6 through 14, the construction of the prisms on Face 2 is such that sunlight from high altitude angles is rejected and sunlight from low altitude angles and light from the northern sky is transmitted toward the interior. The light from the northern sky is transmitted toward the interior. The light which is transmitted may be diffused, for example, by the diffusing ribs 29, 30 on Faces 3 and 4, respectively. In addition, further diffusion may be achieved by the glass fiber mat 45 which is interposed between the spaced walls 23, 24 of the block.

In the prisms shown in Figs. 6 through 14, the light from high sun altitude angles is rejected by total internal reflection through two prisms. I have found that for best results in such rejection, where the skylight walls are made of glass, the included angle P formed by the surfaces is equal to 75°, 30'. I have also found that for a latitude of 42° north the angle $b$, which the southerly surface 31 forms with the plane of the skylight at the topmost portion of the spherical surface, is preferably 40°, with the angle $b$ decreasing progressively in the prisms ranging from the prism at the topmost portion to the southernmost prism and increasing progressively from the prism at the topmost portion to the northernmost prism.

When such a prism structure is used, there is an area or zone between 52° and 71° of sun altitude at which maximum rejection of direct sunlight is obtained. Substantial rejection of sunlight is obtained between 48° and 79°, namely, for approximately 31°. Referring to Table I, which shows sun altitudes for 42° north latitude, it may be observed that this zone of rejection of approximately 31° is sufficiently broad to reject sunlight from high sun altitudes from March through September, namely, 71½°−48½°=23°.

The range of altitude angles through which rejection is accomplished may be shifted by changing the angle $b$. For example, by increasing the angle $b$, the zone of rejection may be shifted thereby rejecting sun from greater altitude angles. By decreasing the angle $b$, the zone of rejection of sunlight may be shifted to reject sunlight from even lower altitude angles.

In order that the rejection may be accomplished in two prisms, the included angle P is preferably equal to 75°, 30' but may range between 60° and 87°. It is preferred that the planes of the spaced walls be positioned horizontally; but, where this prism structure is used, the planes may form an angle with the horizontal as great as 14°.

The change in the angle $b$ from the topmost portion of Face 2 to the southernmost and northernmost edges depends upon the size of the skylight and radii of curvature of Faces 1 and 2. Where the diameter of the skylight is approximately 24 inches, the radius of curvature $R_1$ of Face 1 is approximately 55 inches, and the radius of curvature $R_2$ of Face 2 is approximately 48 inches. I have found that the change in the angle $b$ between the uppermost portion of Face 2 and the edges of Face 2 is approximately 6°. That is, the angle $b$ which the southerly slope or surface makes with the horizontal decreases progressively through 6° from the uppermost portion of Face 2 to the edges of Face 2 and increases progressively through 6° from the uppermost portion of Face 2 to the northernmost edge of Face 2.

The desired rejection of sunlight may also be achieved by rejection through a single prism. For such rejection, the angle P is preferably equal to 90° but may range between 82° and 98°. At 42° north latitude, the angle $b$ which the southerly surface of the uppermost prism forms with a horizontal plane is preferably 29°. With such a structure, there is an area or zone ranging between approximately 59° and 72° of sun altitude at which maximum rejection of direct sunlight is obtained. This zone of rejection extends for approximately 13° and is slightly greater than the range of high altitude angles of the sun which are present from April through August, as shown in Table I, namely, $$71½°−60°=11½°$$

When a prism of such a construction as to provide single prism rejection is used, the zone of rejection may be shifted in the same manner as set forth above, namely, by increasing or decreasing the angle $b$. It is preferred that the planes of the spaced walls be positioned horizontally; but, where this prism structure is used, the planes may form an angle with the horizontal as great as 20°.

I have found that the prisms should preferably be of the same size and shape throughout their length in an east-west direction.

The invention has been described as utilized in a top wall which is of spherical configuration. However, the invention may also be applied to skylights wherein the top wall is arcuate in a north-south plane, for example, cylindrical, oval or other intermediate shapes. As previously noted, the skylight is positioned with the planes of the light-transmitting walls generally horizontal. When used herein, the term "generally horizontal" is intended to include the permissible variations from the horizontal as heretofore defined.

When the skylight is constructed in accordance with the invention, a control of sunlight is achieved wherein direct sunlight from high altitudes is substantially totally rejected and sunlight from low altitudes and light from the northern sky are transmitted. Since the construction does not utilize metal, the skylight is relatively light and the heat transmission therethrough is substantially reduced. The elimination of metal and the utilization of the arcuate configuration permits the skylight to be made in large sizes whereby a single skylight may be mounted in an opening to provide the desired light control. The use of an arcuate wall provides a structure which facilitates drainage of water therefrom, preventing interference of the water with the control of light.

I claim:

1. In a structure for controlling daylight, the combination comprising a ceiling having an opening therethrough and a skylight interposed in said opening, said skylight comprising at least one sheet of light-transmitting material interposed in a generally horizontal position between the daylight and the interior being lighted, said sheet being generally arcuate in a north-south plane, thereby forming convex and concave surfaces, said convex surface being adjacent the daylight, said concave surface nearest the interior being formed with a series of parallel prisms extending in a generally east-west direction, each said prism having a surface extending in a generally southerly direction and a surface extending in a generally northerly direction, the angle which said northerly surface makes with the plane of the glass being greater than the angle which the southerly surface makes with the plane of the glass, the included angle between said surfaces ranging from 60 to 98° such that sunlight from high altitude angles is substantially totally rejected by total internal reflection through said prisms and sunlight from low altitude angles and light from the northern sky are transmitted by refraction through the prisms toward the interior.

2. The combination set forth in claim 1 wherein the corresponding southerly surfaces of said prisms form progressively decreasing angles with the horizontal in the prisms extending between the central uppermost portion of said sheet and the southernmost portion of said sheet and the corresponding southerly surfaces of the prisms form progressively increasing angles with the horizontal in the prisms extending between the central uppermost portion and the northernmost portion of the sheet.

3. The combination set forth in claim 1 wherein said sheet is spherical in shape.

4. The combination set forth in claim 1 including a second sheet of light-transmitting material positioned in spaced relationship to said first sheet adjacent the interior being lighted, said second sheet having light-diffusing means formed thereon for diffusing the light transmitted thereto into the interior.

5. The combination set forth in claim 4 wherein said sheets comprise the walls of a glass block.

6. The combination set forth in claim 4 including a mat of glass fibers interposed between said first and second sheet.

7. The combination set forth in claim 1 wherein the peripheral edge of said sheet of light-transmitting material defines a circle.

8. In a structure for controlling daylight, the combination comprising a ceiling having an opening therethrough and a skylight interposed in said opening, said skylight comprising at least one sheet of light-transmitting material interposed in a generally horizontal position between the daylight and the interior being lighted, said sheet being generally arcuate in a north-south plane, thereby forming convex and concave surfaces, said convex surface being adjacent the daylight, said concave surface nearest the interior being formed with a series of parallel prisms extending in a generally east-west direction, each said prism having a surface extending in a generally southerly direction and a surface extending in a generally northerly direction, the angle which said northerly surface makes with the plane of the glass being greater than the angle which the southerly surface makes with the plane of the glass, the included angle between said surfaces ranging from 60 to 87° such that sunlight from high altitude angles is substantially totally rejected by total internal reflection through said prisms and sunlight from low altitude angles and light from the northern sky are transmitted by refraction through the prisms toward the interior.

9. The combination set forth in claim 8 wherein the corresponding southerly surfaces of said prisms form progressively decreasing angles with the horizontal in the prisms extending between the central uppermost portion of said sheet and the southernmost portion of said sheet and the corresponding southerly surfaces of the prisms form progressively increasing angles with the horizontal in the prisms extending between the central uppermost portion and the northernmost portion of the sheet.

10. The combination set forth in claim 8 wherein said sheet is spherical in shape.

11. The combination set forth in claim 8 wherein the included angle between said prism surfaces is approximately 75°.

12. The combination set forth in claim 11 wherein one of said prisms at the central uppermost portion of said sheet has a surface extending in a southerly direction and forming an angle of approximately 40° with a horizontal plane, the corresponding southerly surfaces of the prisms between said uppermost prism and the southernmost portion of said sheet forming angles of less than 40° with a horizontal plane, the corresponding southerly surfaces of the prisms between said uppermost prism and the northernmost portion of said sheet forming angles greater than 40° with a horizontal plane.

13. The combination set forth in claim 8 including a second sheet of light-transmitting material positioned in spaced relationship to said first sheet adjacent the interior being lighted, said second sheet having light diffusing means formed thereon for diffusing the light transmitted thereto into the interior.

14. The combination set forth in claim 13 wherein said first and second sheets comprise the walls of a glass block.

15. In a structure for controlling daylight, the combination comprising a ceiling having an opening therethrough and a skylight interposed in said opening, said skylight comprising at least one sheet of light-transmitting material interposed in a generally horizontal position between the daylight and the interior being lighted, said sheet being generally arcuate in a north-south plane, thereby forming convex and concave surfaces, said convex surface being adjacent the daylight, said concave surface nearest the interior being formed with a series of parallel prisms extending in a generally east-west direction, each said prism having a surface extending in a generally southerly direction and a surface extending in a generally northerly direction, the angle which said northerly surface makes with the plane of the glass being greater than the angle which the southerly surface makes with the plane of the glass, the included angle between said surfaces ranging from 82 to 98° such that sunlight from high altitude angles is substantially totally rejected by total internal reflection through said prisms and sunlight from low altitude angles and light from the northern sky are transmitted by refraction through the prisms toward the interior.

16. The combination set forth in claim 15 wherein the corresponding southerly surfaces of said prisms form progressively decreasing angles with the horizontal in the prisms extending between the central uppermost portion of said sheet and the southernmost portion of said sheet and the corresponding southerly surfaces of the prisms form progressively increasing angles with the horizontal in the prisms extending between the central uppermost portion and the northernmost portion of the sheet.

17. The combination set forth in claim 15 wherein said sheet is spherical in shape.

18. The combination set forth in claim 15 wherein the included angle between said prism surfaces is approximately 90°.

19. The combination set forth in claim 18 wherein one of said prisms at the central uppermost portion of said sheet has a surface extending in a southerly direction and forming an angle of approximately 29° with a horizontal plane, the corresponding southerly surfaces of the prisms between said uppermost prism and the southernmost portion of said sheet forming angles of less than 29° with a horizontal plane, the corresponding southerly surfaces of the prisms between said uppermost prism and the northernmost portion of said sheet forming angles greater than 29° with a horizontal plane.

20. The combination set forth in claim 15 including a second sheet of light-transmitting material positioned in spaced relationship to said first sheet adjacent the interior being lighted, said second sheet having light diffusing means formed thereon for diffusing the light transmitted thereto into the interior.

21. The combination set forth in claim 20 wherein said first and second sheets comprise the walls of a glass block.

22. A skylight comprising a sheet of light-transmitting material adapted to be positioned in an opening in a ceiling, said sheet being arcuate in cross section along parallel planes thereby providing a concave surface and a convex surface, said convex surface being formed with a multiplicity of prisms extending in parallel relationship substantially transversely to the planes in which said sheet is arcuate, said prisms having surfaces forming an included angle of approximately 60–98°, corresponding surfaces of said prisms forming angles with a plane tangent to the uppermost portion of said convex surface, said latter angles decreasing progressively from the centralmost portion towards one edge of said sheet and increasing progressively from the centralmost portion toward the other edges of said sheet.

23. A structure for controlling daylight comprising a first wall of light-transmitting material, said wall being arcuate in cross section thereby providing a concave surface and a convex surface, said wall being adapted to be mounted in an opening in a ceiling or roof with a concave surface thereof projecting upwardly above said opening, a second wall of light-transmitting material in spaced relationship adjacent the concave surface of said first wall, said first wall being formed with prisms on the concave surface thereof nearest said second wall, said prisms being parallel and extending in planes substantially transverse to the planes in which said first wall is arcuate, said prisms having an included angle ranging from 60 to 98° such that light rays directed against the convex surface of said first wall at small predetermined angles to and on one side of transverse planes normal to a plane tangent to the uppermost prism on said concave surface are substantially totally rejected by total internal reflection and light rays directed against said convex surface at the remaining angles on the same side of said normal transverse planes and light rays directed against said convex surface on the other side of said normal transverse planes are transmitted by refraction through said first wall toward said second wall.

24. The structure set forth in claim 23 wherein each said prism has surfaces forming included angles of approximately 75°.

25. The structure set forth in claim 24 wherein one of said prisms on the centralmost portion of said convex surface forms an angle of approximately 40° with a plane tangent to the centralmost portion of said wall, the corresponding surfaces of the prisms between said centralmost prism and one extremity of said wall forming angles of less than 40° with a plane tangent with the centralmost portion of said wall, the corresponding surfaces of the prisms between said centralmost prism and the opposite extremity of said wall forming angles greater than 40° with the plane tangent to said centralmost portion of said wall.

26. The structure set forth in claim 25 wherein the corresponding surfaces form progressively decreasing angles with the tangent plane in the prisms extending between the centralmost portion and the first extremity of said wall and the corresponding surfaces of the prisms form progressively increasing angles with the tangent plane in the prisms extending between the centralmost portion and the opposite extremity of said wall.

27. The structure set forth in claim 23 wherein each said prism has surfaces forming an included angle of approximately 90°.

28. A structure for controlling daylight comprising a hollow block made of light-transmitting material and including spaced light-transmitting walls, said block being adapted to be mounted in an opening in a ceiling in such a manner that the light-transmitting walls are in substantially horizontal position, one said wall of said block having a cross section which is arcuate in a longitudinal plane thereby providing a convex surface adjacent the exterior of the block and a concave surface adjacent the second wall of the block, said concave surface of said arcuate wall having a series of parallel prisms formed thereon extending transversely to the longitudinal plane of said block, each said prism having an included angle ranging from 60 to 98° such that light rays directed against the convex surface of said first wall at small intermediate predetermined angles to and on one side of transverse planes normal to a plane tangent to the uppermost prism on said concave surface are substantially totally rejected by total internal reflection and light rays directed against said convex surface at the remaining angles on the same side of said normal transverse planes and light rays directed against said convex surface on the other side of said normal transverse planes are transmitted by refraction through said first wall toward said second wall of the block.

29. The structure set forth in claim 28 wherein said second wall is arcuate in a longitudinal plane thereby providing a convex surface adjacent the exterior of the block and a concave surface adjacent the concave surface of the first wall.

30. The structure set forth in claim 28 wherein corresponding surfaces of said prisms form angles with a plane tangent to the centralmost portion of said concave surfaces of the first wall, which angles change progressively in magnitude from the centralmost portion of said first wall toward the extremities of said first wall.

31. The structure set forth in claim 28 wherein corresponding surfaces of each prism form angles with a plane tangent to the centralmost portion of the first wall, said angles decreasing progressively in magnitude from the centralmost portion of the first wall toward one edge of the first wall and increasing progressively in magnitude from the centralmost portion of the first wall toward the other edge of said first wall.

32. The structure set forth in claim 31 wherein the prism at the centralmost portion of the concave surface of the first wall has a surface forming an angle of approximately 40° with the tangent plane, each said prism having surfaces forming an included angle ranging from 60° to 87°.

33. The structure set forth in claim 31 wherein the prism at the centralmost portion of said first wall has a surface thereof forming an angle of approximately 23° with the tangent plane, each said prism having surfaces forming an included angle ranging from 82° to 98°.

34. A skylight comprising a sheet of light-transmitting material adapted to be positioned in an opening in a ceiling, said sheet being arcuate in cross section along parallel planes thereby providing a concave surface and a convex surface, said convex surface being formed with a multiplicity of prisms extending in parallel relationship substantially transversely to the planes in which said sheet is arcuate, said prisms having surfaces forming an included angle of approximately 60–87°, corresponding surfaces of said prisms forming angles with a plane tangent to the uppermost portion of said convex surface, said latter angles decreasing progressively from the centralmost portion towards one edge of said sheet and increasing progressively from the centralmost portion toward the other edges of said sheet.

35. A skylight comprising a sheet of light-transmitting material adapted to be positioned in an opening in a ceiling, said sheet being arcuate in cross section along parallel planes thereby providing a concave surface and a convex surface, said convex surface being formed with a multiplicity of prisms extending in parallel relationship substantially transversely to the planes in which said sheet is arcuate, said prisms having surfaces forming an included angle of approximately 82–98°, corresponding surfaces of said prisms forming angles with a plane tangent to the uppermost portion of said convex surface, said latter angles decreasing progressively from the centralmost portion towards one edge of said sheet and increasing progressively from the centralmost portion toward the other edges of said sheet.

References Cited in the file of this patent

UNITED STATES PATENTS

| | | |
|---|---|---|
| 191,802 | Howard | June 12, 1877 |
| 232,399 | Geddes | Sept. 21, 1880 |
| 586,256 | Winslow | July 13, 1897 |
| 2,118,643 | Fox | May 24, 1938 |
| 2,179,862 | Rolph | Nov. 14, 1939 |
| 2,322,591 | Rapp | June 22, 1943 |
| 2,703,060 | Kiefer | Dec. 3, 1956 |
| 2,740,903 | Willcox | Apr. 3, 1956 |

FOREIGN PATENTS

| | | |
|---|---|---|
| 355,297 | France | Aug. 24, 1905 |

OTHER REFERENCES

Engineering News-Record, December 16, 1954, page 53.